(12) United States Patent
Kolbe et al.

(10) Patent No.: US 11,020,928 B2
(45) Date of Patent: Jun. 1, 2021

(54) REMOVAL APPARATUS AND ROTARY PRESS

(71) Applicant: Fette Compacting GmbH, Schwarzenbek (DE)

(72) Inventors: Sven Kolbe, Buechen (DE); Stefan Luedemann, Hamburg (DE)

(73) Assignee: Fette Compacting GmbH, Schwarzenbek (DE)

( * ) Notice: Subject to any disclaimer, the term of this patent is extended or adjusted under 35 U.S.C. 154(b) by 0 days.

(21) Appl. No.: 16/839,649

(22) Filed: Apr. 3, 2020

(65) Prior Publication Data
US 2020/0316895 A1    Oct. 8, 2020

(30) Foreign Application Priority Data

Apr. 5, 2019 (DE) ................. 10 2019 108 969.7

(51) Int. Cl.
| | |
|---|---|
| *B30B 11/08* | (2006.01) |
| *B30B 15/32* | (2006.01) |
| *B30B 11/00* | (2006.01) |
| *B30B 15/02* | (2006.01) |
| *B29B 11/12* | (2006.01) |

(52) U.S. Cl.
CPC ............ *B30B 15/32* (2013.01); *B30B 11/005* (2013.01); *B30B 11/08* (2013.01); *B30B 15/02* (2013.01); *B29B 11/12* (2013.01)

(58) Field of Classification Search
CPC ........... B29B 9/10; B29B 11/12; B30B 11/08; B30B 15/32
USPC ...................................... 425/345, 422, 436 R
See application file for complete search history.

(56) References Cited

U.S. PATENT DOCUMENTS

| | | | |
|---|---|---|---|
| 2,235,286 A | * | 3/1941 | Cookson ................. B30B 11/08 198/359 |
| 2,518,868 A | | 8/1950 | Cookson |
| | | (Continued) | |

FOREIGN PATENT DOCUMENTS

| | | |
|---|---|---|
| CN | 100480032 | 4/2009 |
| EP | 2707207 B1 | 8/2018 |
| | (Continued) | |

OTHER PUBLICATIONS

Fette Compacting GmbH; EP 20160602.7; filed Mar. 3, 2020; European Search Report dated Oct. 6, 2020 (26 pages).

*Primary Examiner* — James P Mackey
(74) *Attorney, Agent, or Firm* — Barclay Damon LLP

(57) ABSTRACT

A removal apparatus for removing pellets from a die plate of a rotary press comprises a housing and a first channel positioned on the housing and configured to receive pellets removed from the die plate. A guide element is arranged on the housing and positioned over the die plate. The guide element is configured to guide pellets produced in the rotary press from the die plate into the first channel. The guide element and the first channel are moveably mounted on the housing. A plurality of mechanical positioning elements are configured to be alternatively inserted into the housing and cooperate with the guide element and the first channel to movably position the guide element and the first channel relative to the housing. Each of the mechanical positioning elements defines a different position of one of the guide element and the first channel relative to the housing.

14 Claims, 4 Drawing Sheets

(56) References Cited

U.S. PATENT DOCUMENTS

| | | | | |
|---|---|---|---|---|
| 5,322,655 | A * | 6/1994 | Ebey | B07C 5/365 |
| | | | | 264/109 |
| 7,665,596 | B2 * | 2/2010 | Kolbe | B65G 47/71 |
| | | | | 198/367 |
| 8,078,329 | B2 * | 12/2011 | Boeckx | B30B 15/32 |
| | | | | 700/283 |
| 8,490,773 | B2 * | 7/2013 | Kolbe | B30B 11/08 |
| | | | | 198/355 |
| 10,322,556 | B2 * | 6/2019 | Carstens | B30B 15/32 |
| 10,399,259 | B2 * | 9/2019 | Arning | B29C 43/36 |
| 10,513,073 | B2 | 12/2019 | Kolbe | |

FOREIGN PATENT DOCUMENTS

| | | |
|---|---|---|
| JP | H02243158 | 9/1990 |
| JP | 2015145020 A | 8/2015 |
| KR | 1020130065148 A | 6/2013 |

* cited by examiner

REMOVAL APPARATUS AND ROTARY PRESS

CROSS REFERENCE TO RELATED INVENTION

This application is based upon and claims priority to, under relevant sections of 35 U.S.C. § 119, German Patent Application No. 10 2019 108 969.7, filed Apr. 5, 2019, the entire contents of which are hereby incorporated by reference.

BACKGROUND

The invention relates to a removal apparatus for removing pellets from a die plate of a rotary press, comprising a housing, a removal element or guide element that is arranged on the housing and that can be positioned over the die plate for removing pellets produced in the rotary press from the die plate, and a first channel portion arranged on the housing for guiding away pellets removed from the die plate. The invention furthermore relates to a rotary press having such a removal apparatus.

Rotary presses comprise a rotor that is generally driven so as to rotate about a vertical axis and that has an upper and a lower punch guide for an upper and lower press punch and a die plate between the punch guides. The press punches rotate together with the die plate and are moved axially for example by means of control cams during their rotation. In addition to at least one filling and dosing station, in which material to be pressed is filled into receiving means of the die plate, and a pressing station, in which the material filled into the receiving means is pressed into pellets, in particular tablets, by means of the upper and lower press punches, rotary presses of this kind also comprise an ejection station. In said ejection station, the pellets produced are usually conveyed onto the upper face of the die plate by means of lifting of the lower punch. A removal element arranged in a stationary manner downstream in the direction of rotation of the rotor removes the tablets located on the rotating die plate from the die plate and conveys said tablets into a discharge channel for transportation away from the rotary press. Removal elements of this kind generally also comprise a discarding apparatus, for example a discarding nozzle, which discards tablets to be discarded due to quality defects, for example by means of directed compressed air, out of the tablet flow into an additional discharge channel.

Pellets of various sizes can be produced by means of rotary presses. The removal elements frequently comprise a bend, along which the pellets are guided to the outlet of the rotary press under the effect of the die plate that is moved on in a rotating manner under the stationary removal element. Depending on the size of the tablets, in particular the diameter thereof, or in the case of non-circular shapes or another characteristic dimension, the removal elements are individually positioned manually by an operator in order to ensure proper guiding by the removal element. Even a first channel portion, into which pellets to be discarded can be conveyed by means of the discarding apparatus, can be individually positioned in order to ensure a sufficient but also minimal distance between the discarding apparatus and the first channel portion, depending on the pellet format. Typically, the removal element and, if applicable, the first channel portion are shifted by the operator in the radial direction relative to the die plate in order to adapt to different pellet dimensions.

A disadvantage of this approach is that it cannot be reliably ensured that the relevant operator will position the relevant pellet correctly in view of the size thereof. This can damage or even break the pellets on account of excessively strong loading during removal. Since bad pellets are usually discarded before the actual removal procedure in the conveying direction of the pellets, a damaged or destroyed pellet can no longer be discarded during the removal procedure, and therefore said pellet may potentially be fed to the outlet for satisfactory pellets.

In order to overcome this disadvantage, EP 2 707 207 B1 proposes providing the removal element comprising an identification and/or positioning unit with identification and/or positioning data relating to the removal element and equipping a removal apparatus comprising said removal element with a reading and/or writing unit, which is designed to read out the identification and/or positioning data from the identification and/or positioning unit. In this way, it is possible to check whether the removal element remains in a specified position in an automated manner and it is also possible to check whether the relevant removal element used is the correct removal element for the relevant pellets to be produced. In particular, different removal elements for different pellet formats are then provided, which are individually and precisely adapted to the relevant pellet format. In this way, a particularly good adaptation to the pellet format to be produced is possible and a reliable checking option is set up. However, the storage of different removal elements and, if applicable, first channel portions results in a not insignificant outlay that is not always justified.

BRIEF SUMMARY OF THE INVENTION

Proceeding from the explanatory prior art, the object of the invention is therefore to provide a removal apparatus and a rotary press of the type mentioned at the outset, by means of which damage to pellets caused by the removal element can be prevented and reliable discarding of bad tablets can be ensured in a cost-effective manner.

For a removal apparatus of the type mentioned at the outset, the invention achieves the object in that the removal element and the first channel or first channel portion are movably or shiftably mounted on the housing, and in that the removal apparatus comprises a plurality of mechanical positioning means, such as mechanical positioning elements, that can be alternatively inserted into the housing and that in each case cooperate with the removal element and the first channel portion when inserted in the housing such that the removal element and the first channel portion are arranged in a position on the housing defined by the respective mechanical positioning means, the defined position for the removal element and/or the first channel portion being different for different mechanical positioning means.

In an embodiment, the removal apparatus according is used to remove pellets, in particular tablets, from a die plate of a rotary press. The rotary press may in particular be a rotary press. The removal element of the removal apparatus is arranged downstream of the ejection station in the direction of rotation of the rotor of the rotary press when mounted on the rotary press. The removal element is arranged in a stationary manner above the die plate and at a short distance therefrom such that pellets ejected onto the upper face of the die plate in the ejection station are removed by the removal apparatus from the die plate rotating thereunder. The removal element or guide element may for example be an arm or extension comprising a bend, for example a sickle-shaped bend, along which the pellets are guided under the effect of the die plate that is moved on in a rotating manner under the stationary guide element into one or more channels. The removal apparatus further comprises a first channel portion arranged on the housing and configured to guide away pellets removed from the die plate by the guide element. The first channel portion may be connected to a first discharge channel configured to guide away pellets from the rotary press. In an embodiment, the first channel portion may be a bad channel portion, which is connected to a so-called bad channel for pellets detected to be of insufficient quality by a sensor system of the rotary press. As explained in greater detail below, the removal apparatus may also comprise a discarding apparatus that discards such pellets detected to be bad from the tablet flow into the first channel portion before said pellets are removed from the die plate by the guide element. As also explained in greater detail below, the removal apparatus may further comprise a second channel or second channel portion arranged downstream of the first channel portion in the direction of rotation of the rotor, into which second channel portion the pellets removed by the guide element are conveyed. Said second channel portion may also be connected to a discharge channel for guiding away pellets from the rotary press. In this case, it may be a good channel portion, which is accordingly connected to a good channel for pellets detected to be of sufficient quality.

The housing of the removal apparatus according to the invention may be configured as a column. It may in particular be a so-called removal column, which is arranged on the press housing of the rotary press. The guide element and the first channel portion are in particular mounted on the housing so as to be shiftable in the radial direction relative to the die plate. They may in particular be mounted on the housing so as to be shiftable in a longitudinal direction of the first channel portion. According to the invention, mechanical positioning means that can be inserted into the housing are provided. They clearly define the position of the guide element and of the first channel portion mechanically and (only) by being inserted into the housing. For this purpose, they cooperate with the guide element and the first channel portion when inserted in the housing. The force required for positioning the guide element and first channel portion can be manually applied in particular by an operator during insertion of the positioning means into the housing. Therefore, no separate drive is required for this. In this way, the risk of incorrect positioning is eliminated. In an embodiment, a plurality of mechanical positioning means are provided, which can be inserted into the housing as desired and alternatively to one another. At least two mechanical positioning means, in particular, are provided, preferably more than two mechanical positioning means. Different mechanical positioning means define different positions of the guide element and/or the first channel portion in relation to the housing of the removal apparatus and/or in relation to the die plate in the assembled state. By selecting the mechanical positioning means suitable for the relevant pellet format, the correct position of the guide element and first channel portion can in this way be ensured in a simple and reliable manner. Laborious and unreliable manual positioning of the guide element and first channel portion is not required, and different guide elements and, if applicable, first channel portions do not need to be stored for different pellet formats. Rather, the removal apparatus with the guide element and first channel portion thereof can be used for all pellet sizes produced in the relevant rotary press. On account of the reliable positioning, the invention prevents damage to pellets caused by the guide element in a cost-effective manner and ensures reliable discarding of bad pellets.

As already explained, the removal apparatus may further comprise a second channel portion arranged on the housing. As already explained as well, the second channel portion may be a so-called good channel for satisfactory pellets, i.e. pellets detected to be of sufficient quality by a sensor system of the rotary press.

According to another embodiment, the second channel portion may also be moveably or shiftably mounted on the housing. The position of the second channel portion may also be defined by means of the plurality of mechanical positioning means. The second channel portion may in particular also be mounted on the housing so as to be shiftable in the radial direction relative to the die plate. It may in particular be mounted on the housing so as to be shiftable in a longitudinal direction of the second channel portion. In this embodiment, the mechanical positioning means also mechanically cooperate with the second channel portion when inserted in the housing such that the second channel portion is arranged in a position on the housing defined by the respective mechanical positioning means, it in turn being possible for the position to differ for different mechanical positioning means. The embodiments explained in this application relating to the mechanical positioning means and the cooperation thereof with the guide element and/or first channel position may correspondingly also be provided for the second channel portion. In the above-mentioned embodiments, the second channel portion is advantageously also adapted to different pellet formats. It is also possible in a particularly simple manner to rigidly connect the second channel portion to the guide element such that these are positioned together when the mechanical positioning means are inserted into the housing.

According to another embodiment, pellets produced in the rotary press may be guided into the second channel portion by means of the guide element, the first channel portion may be arranged upstream of the second channel portion, and the guide element may comprise a discarding apparatus by means of which pellets to be discarded are guided into the first channel portion. The first channel portion is arranged upstream of the second channel portion, in particular in the direction of rotation of the die plate or in the conveying direction of the pellets. If pellets are not discarded by the discarding apparatus, they are removed into the second channel portion by the guide element. As already explained, the second channel portion may be provided for satisfactory pellets and the first channel portion may be provided for pellets detected to be bad by a sensor system of the rotary press. If pellets are detected to be bad by the sensor system, they are conveyed by the discarding apparatus into the first channel portion before being removed into the second channel portion by the guide element. The discarding apparatus may comprise a discarding nozzle configure to guide pellets to be discarded into the first channel portion by means of a directed blast of compressed air.

According to a particularly practicable embodiment, the mechanical positioning means may comprise positioning pins that engage in corresponding pin receiving means or pin receivers of the guide element and first channel portion when inserted in the housing. In an embodiment, the pin receivers may comprise one or more channels, slots, cavities, or other such feature configured to engage and retain the positioning pins. It is also possible for the guide element and the first channel portion to comprise positioning pins that engage in corresponding pin receiving means of the mechanical positioning means when inserted into the housing. The positioning pins may for example be cylindrical positioning pins. The positioning receiving means may be correspondingly cylindrical positioning receiving means. When the positioning pins engage in the pin receiving means, the mechanical positioning means mechanically cooperate with the guide element and the first channel portion. Particularly simple mechanical positioning therefore takes place. With different positioning means, the positioning pins and positioning receiving means can easily be arranged at different positions. As a result, different positions of the guide element and/or first channel portion are produced.

According to another embodiment, insertion portions that lead into the pin receiving means and that taper toward the pin receiving means may be provided. The insertion portions may for example taper in the manner of a truncated cone. When the positioning means are inserted into the housing, said insertion portions guide positioning pins oriented so as to be laterally offset to the positioning receiving means into the positioning receiving means while also shifting the guide element and/or first channel portion. Automatic positioning of the guide element and/or first channel portion therefore takes place during insertion of the positioning means into the housing. Manual orientation of the guide element and first channel portion is not required for this.

According to another embodiment, the mechanical positioning means may each comprise a guide support which can be inserted into the housing and on which the positioning pins or positioning receiving means are formed. The guide support may for example be configured as a guide plate. The guide support clearly defines the position of the mechanical positioning means in the housing. As a result, the position of the positioning pins or positioning receiving means and thus the position of the guide element and first channel portion are clearly defined.

According to another embodiment, the guide element and the first channel portion may each be arranged on a guide carriage that is moveably or shiftably mounted on the housing. The guide carriages are each shiftably mounted in a corresponding receiving means of the housing. In this way, the guide elements and/or the first channel portion are moveably or shiftably mounted on the housing in a particularly simple manner. The pin receiving means and, if applicable, the tapered insertion portions of the guide element and of the first channel portion or the positioning pins of the guide element and of the first channel portion may be formed on the guide carriages.

According to another embodiment, the mechanical positioning means may each comprise identification means or identifier by means of which they can be clearly identified. In this way, it is easy to check whether the inserted positioning means are the correct ones and thus whether the position of the guide element and first channel portion is appropriate for the relevant pellet format. In the simplest case, these may be optical identification means that can be read by an operator or automatically by a corresponding reading apparatus. By way of example, this may be an inscription, a bar code, a color coding, or the like. In another embodiment, the identification means may comprise an RFID transponder that can be read by a reading apparatus of the rotary press. Automatic readability can therefore be provided in a particularly reliable manner using a reading apparatus of the rotary press. The reading apparatus may be connected to the control apparatus of the rotary press, which control apparatus can immediately check the suitability of the positioning means used for the pellet format to be produced based on the reading.

The invention also relates to a rotary press comprising a control apparatus and a rotor. The rotor comprises an upper and a lower punch guide for upper and lower press punches as well as a die plate between the punch guides. The press punches cooperate with receiving means of the die plate. The rotary press further comprises at least one filling station in which material to be pressed is filled into the receiving means and at least one pressing station that cooperates with the upper press punches and lower press punches during operation such that said punches press material located in the receiving means into pellets. The rotary press further comprises at least one ejection station in which the pellets are conveyed from the receiving means onto the die plate and at least one removal apparatus according to the invention.

The rotary press may in principle be designed in a manner known per se. It may comprise a so-called die plate having a plurality of receiving means in which the material to be pressed is pressed. The receiving means may be so-called die holes. Die bushings may be arranged in the die holes, but this is not absolutely required, and the press punches may cooperate directly with the die holes. The die plate may be configured as one single piece or consist of die segments. The rotor is driven by a rotary drive so as to rotate about a vertical axis, for example. The pellets produced using the rotary press may be tablets. The material to be pressed may be a powder. The rotary press according to the invention may also comprise a reading apparatus for reading the identification means of the mechanical positioning means. Said reading apparatus may be connected to the control apparatus of the rotary press. The control apparatus may be configured to check whether the mechanical positioning means used are the correct ones for the pellet format to be produced based on the readings of the reading apparatus. If the control apparatus determines that incorrect positioning means are being used, it may for example issue a warning signal.

BRIEF DESCRIPTION OF THE DRAWINGS

Exemplary embodiments of the invention are explained in greater detail below based on figures, in which schematically.

The same reference numbers refer to the same objects in the figures unless indicated otherwise.

DETAILED DESCRIPTION OF THE INVENTION

Figure 1:
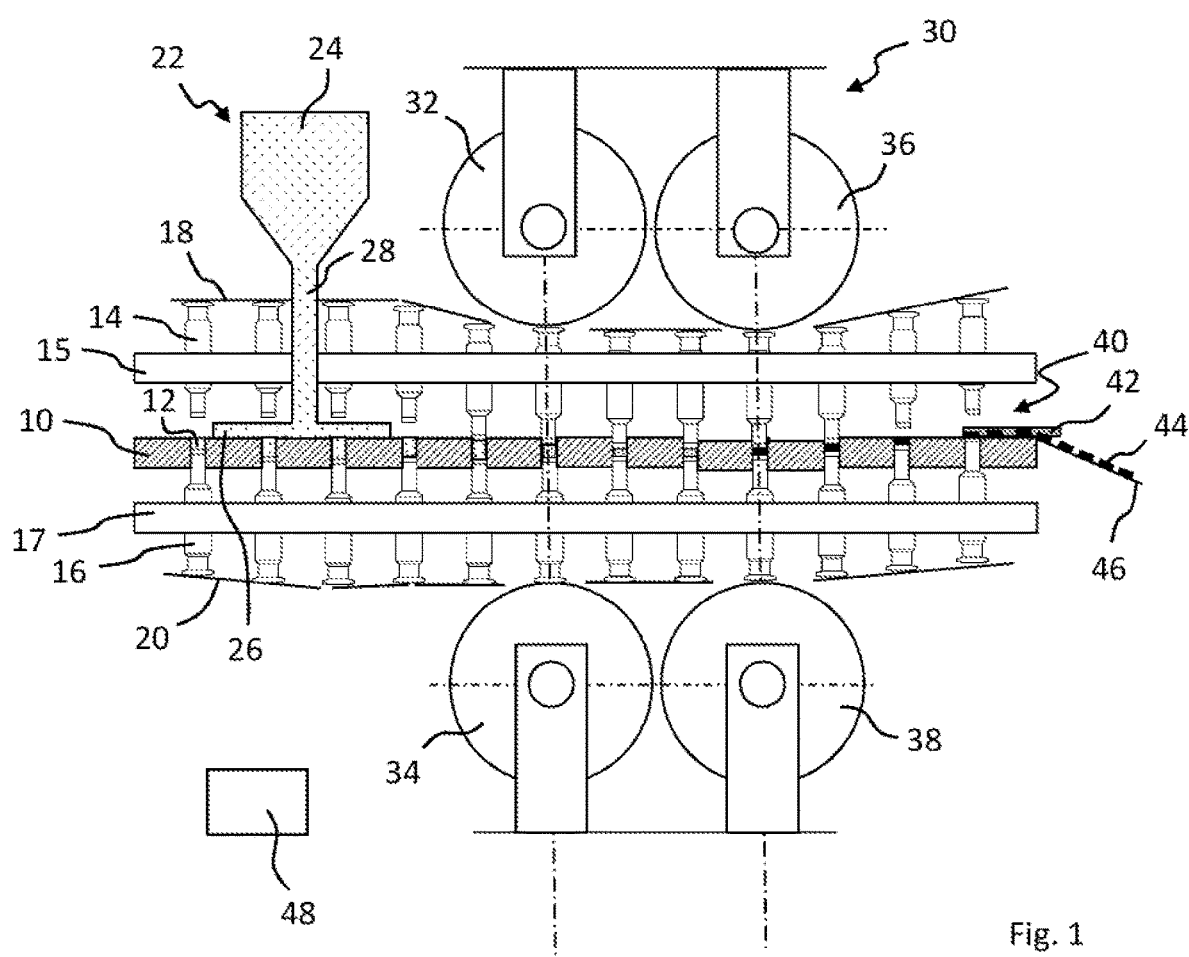
FIG. 1 illustrates a partial cross-sectional view of an embodiment of a rotary press.
Figure 2:
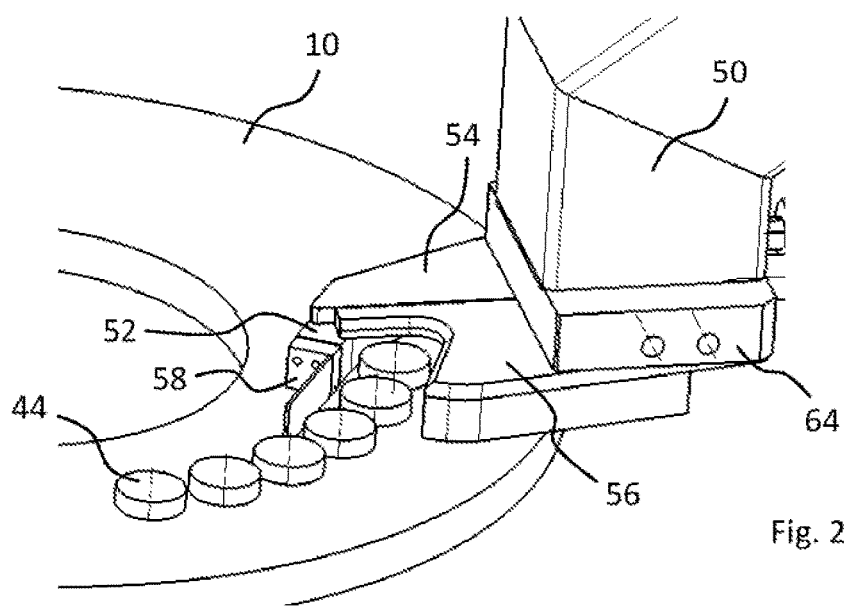
FIG. 2 illustrates a top perspective view of a portion of an embodiment of a removal apparatus.
Figure 3:
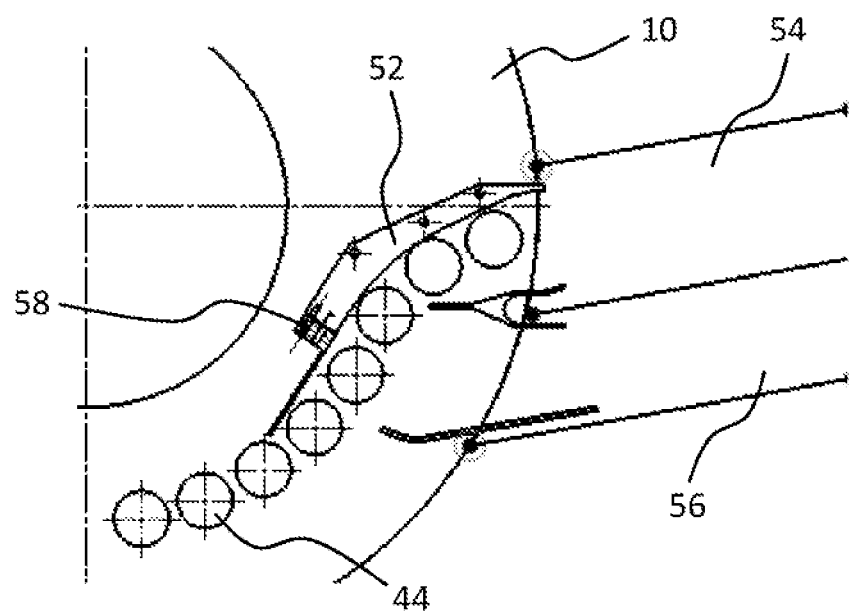
FIG. 3 illustrates a top plan view of the embodiment of the removal apparatus of FIG. 2.

The rotary press shown in FIG. 1, in particular the rotary tablet press, comprises a rotor that is rotationally driven by a rotary drive with a die plate 10 which has a plurality of receiving means 12. The receiving means 12 may for example be formed by holes in the die plate 10. Furthermore, the rotor comprises a plurality of upper punches 14 and lower punches 16 that rotate synchronously with the die plate 10. The upper punches 14 are axially guided in an upper punch guide 15 and the lower punches 16 are axially guided in a lower punch guide 17. The axial movement of the upper punch 14 and lower punch 16 during the rotation of the rotor is controlled by upper control cam elements 18 and lower control cam elements 20. The rotary press further comprises a filling apparatus 22, which comprises a filling reservoir 24 and a filling chamber 26, which are connected via a feed section 28. In this way, the powdered filling material in the present example passes under the force of gravity from the filling reservoir 24 via the feed section 28 into the filling chamber 26, and passes therefrom via a filling opening provided in the bottom side of the filling chamber 26 into the receiving means 12 of the die plate 10, again under the force of gravity.

The rotary press further comprises a pressing station 30. The pressing station 30 has a pre-pressing apparatus having an upper pre-pressing roller 32 and a lower pre-pressing roller 34, as well as a main pressing apparatus having an upper main pressing roller 36 and a lower main pressing roller 38. Furthermore, the rotary press comprises an ejection station 40 and a removal apparatus 42 (shown very schematically in FIG. 1) comprising a guide element, which supplies the pellets 44, in particular tablets, produced in the rotary press to a discharge channel 46.

A control apparatus for operating the rotary press is shown with reference number 48. The control apparatus 48 is connected by lines (not shown) to, inter alia, the rotary drive of the rotor and controls the rotary press during operation. The control apparatus 48 also comprises a reading apparatus or a reader for reading identification means of mechanical positioning means of the removal apparatus 42, which identification means will be described in greater detail below.

The removal apparatus shown in FIGS. 2-6 comprises a housing 50, which is fastened, for example, to a press frame of the rotary press. The housing 50 is not shown in FIG. 3 for illustrative purposes and is only partially shown in FIG. 4-6. The removal apparatus 42 comprises a guide element 52 that is arranged above the die plate 10 in the assembled state and that is approximately a sickle-shaped extension of projection in the example shown. By means of the guide element 52, pellets 44 conveyed onto the upper face of the die plate 10 by means of the ejection station 40 are conveyed from the die plate 10 into a second channel portion 54. The second channel portion 54 is connected to the discharge channel 46 as a good channel for guiding away satisfactorily produced pellets 44 from the rotary press. The removal apparatus 42 additionally comprises a first channel portion 56, which is arranged upstream of the second channel portion 54 in the direction of rotation of the rotor or in the conveying direction of the pellets 44. The removal apparatus 42 further comprises a discarding apparatus 58, in the example shown a discarding nozzle, by means of which pellets 44 detected to be bad by a sensor system of the rotary press, for example, can be fed to the first channel portion 56. The first channel portion 56 is connected to a bad channel for guiding away the pellets 44 detected to be bad. For the discarding, in a manner known per se, the discarding apparatus 58 sends out a blast of compressed air, which conveys the corresponding pellets 44 from the flow into the first channel portion 56 before they are removed by the guide element 52.

The guide element 52 may be rigidly connected to the second channel portion 54. In the example shown, the first channel portion 56 and the guide element 52, and if applicable the second channel portion 54 in conjunction herewith, are mounted on the housing 50 so as to be longitudinally shiftable in a direction that extends substantially radially with respect to the die plate 10. In this way, the guide element 52 and the first channel portion 56, as well as the second channel portion 54, if applicable, can be adapted to different pellet formats. The direction of movement of the first channel portion 56 and of the guide element 52 together with the second channel portion 54 is illustrated in FIG. 6 by way of example by means of the arrows 60, 62.

Figure 4:
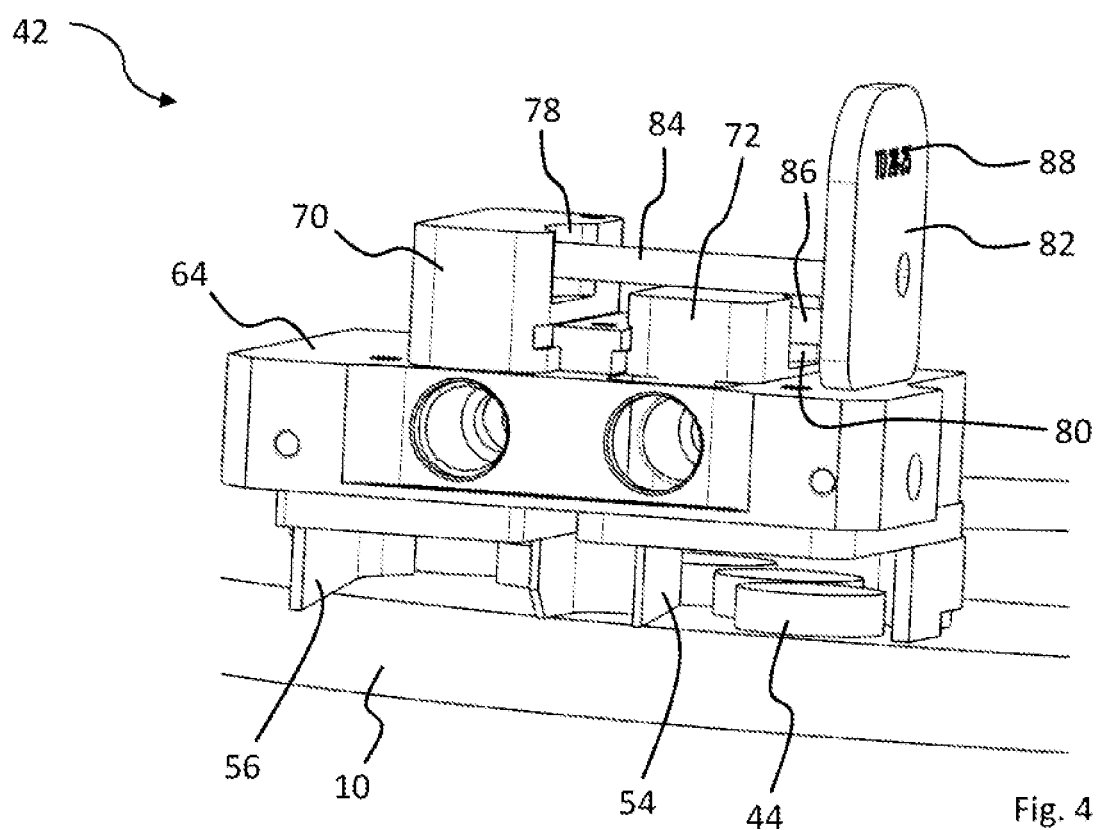
FIG. 4 illustrates a perspective view of the portion of the removal apparatus of FIG. 2.
Figure 5:
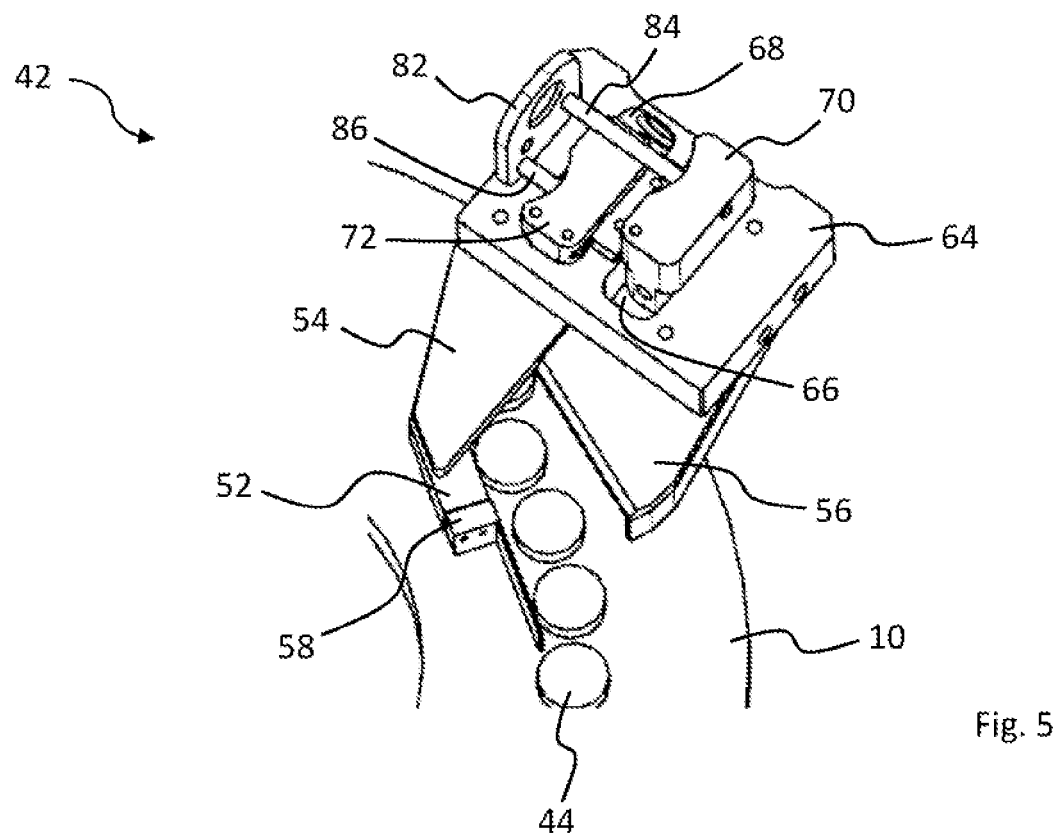
FIG. 5 illustrates a top perspective view of the portion of the removal apparatus of FIG. 4.
Figure 6:
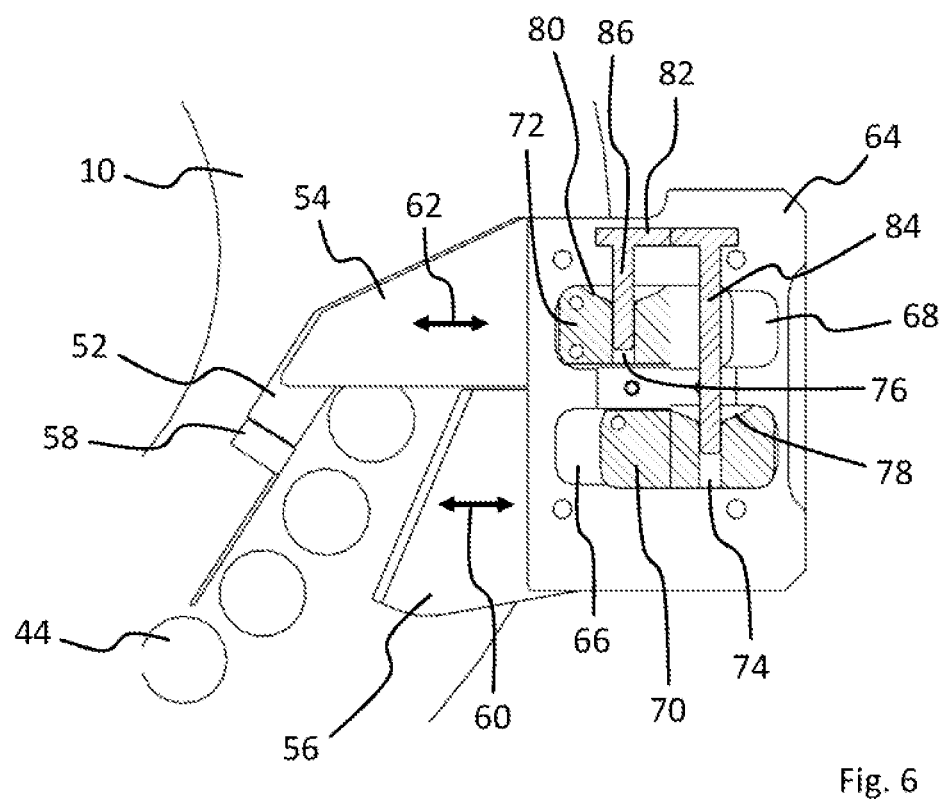
FIG. 6 illustrates a partial cross-sectional view of the embodiment of the removal apparatus of FIGS. 4 and 5.

The positioning of the guide element 52 and of the first channel portion 56 shall be explained in greater detail based on FIGS. 4-6, in which parts of the housing 50 have not been shown for illustrative purposes. The housing 50 comprises a base plate 64, in which guide receiving means 66, 68 are provided, in each of which guide receiving means a guide carriage 70, 72 is moveably or shiftably mounted. In an embodiment, the guide receiving means may be a one or more openings, slots, cavities or other such features configured to receive a guide carriage and allow movement of the guide carriage relative to the base plate 64. The guide carriage 70 is rigidly connected to the first channel portion 56 and the second guide carriage 72 is rigidly connected to the guide element 52 and, if applicable, to the second channel portion 54. By shifting the guide carriage 70, 72 in the guide receiving means 66 or 68, respectively, the first channel portion 56 and the guide element 52, and if applicable the second channel portion 54 in conjunction herewith, can be shifted as illustrated by the arrows 60, 62 in FIG. 6. The guide carriages 70, 72 each comprise a pin receiving means 74, 76, on one side of each of which an insertion portion 78, 80 that leads into the pin receiving means 74 or 76, respectively, and that tapers toward the pin receiving means 74 or 76, respectively, is formed. The removal apparatus 42 further comprises mechanical positioning means, which, in the example shown, comprise two positioning pins 84, 86 formed on a guide support 82, in particular a support plate. The mechanical positioning means can be inserted with the guide support 82 thereof in a clearly defined position into the housing 50 and taken out therefrom by an operator. During insertion into the housing 50, the positioning pins 84, 86 are received by the pin receiving means 74 and 76, respectively, of the guide carriages 70 and 72, respectively. As can be seen by way of example in FIGS. 4 and 5, the positioning pins 84, 86 are in different horizontal planes and have a different length. Moreover, the guide carriages 70, 72 are at a different height, such that the positioning pins 84, 86 can be received by the pin receiving means 74 and 76, respectively, of the guide carriages 70 and 72, respectively, the positioning pin 84 extending above the guide carriage 72 into the guide carriage 70 arranged therebehind. On account of the mechanical cooperation between the positioning pins 84, 86 and the pin receiving means 74, 76, the position of the guide carriages 70, 72 in the receiving means 66, 68, and therefore the position of the first channel portion 56 and of the guide element 52 and, if applicable, the second channel portion 54, is clearly defined.

The removal apparatus 42 according to the invention comprises a plurality of such mechanical positioning means, the guide supports 82 of which are in particular each configured to be identical, but which may differ in terms of the arrangement of the positioning pins 84, 86 such that said positioning pins can be at a different distance and/or in a different position relative to the die plate 10, in particular in the plan view of FIG. 6, i.e. in the radial direction. If, for example, the mechanical positioning means shown in FIGS. 4-6 are then taken out of the housing 50 and other mechanical positioning means having positioning pins arranged in a different manner are inserted into the housing 50, the position in the housing 50 in turn being clearly defined by means of the guide support, the positioning pins of the other mechanical positioning means are initially oriented non-coaxially to the pin receiving means 74 and/or 76 of the guide carriages 70, 72 still located in their previous position. During insertion of said other mechanical positioning means, the positioning pins positioned in a different manner then initially come into contact with the tapered insertion portions 78 and/or 80. On account of the, in particular conical, tapering, this causes the guide carriages 70, 72 to shift such that the previously non-coaxially oriented pin receiving means 74, 76 are now oriented coaxially to the positioning pins and the positioning pins can accordingly be received by the pin receiving means 74, 76. On account of the resulting shift of the guide carriages 70, 72, the first channel portion 56 and/or the guide element 52 and, if applicable, the second channel portion 54 are accordingly also shifted. In this way, the position of the first channel portion 56 and of the guide element 52 and, if applicable, the second channel portion 54 is adapted in a simple and cost-effective manner to an altered pellet format, for example.

FIG. 4 shows identification means of the mechanical positioning means in the form of an inscription 88. In this way, an operator, for example, can visually check at any time whether the correct mechanical positioning means for the relevant pellet format are being used.

Figure 7:
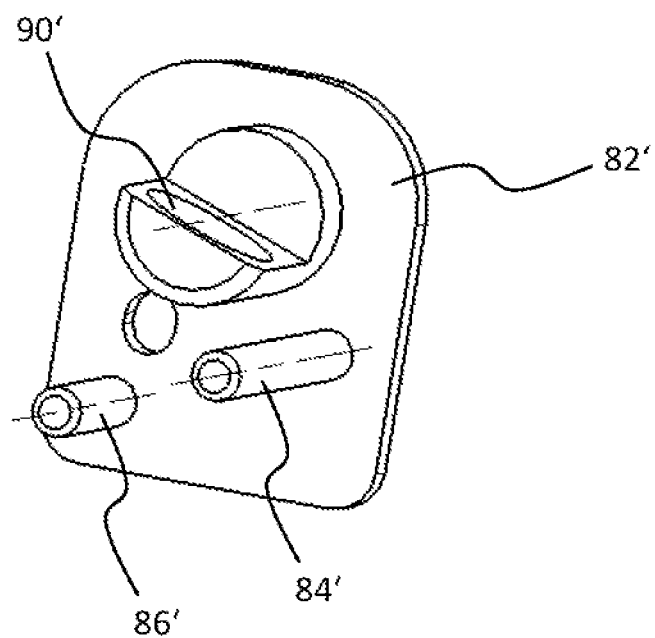
FIG. 7 illustrates a perspective view of an embodiment of a mechanical positioning means of the removal apparatus.

FIG. 7 shows mechanical positioning means according to another exemplary embodiment. These mechanical positioning means also comprise a guide support 82', in particular a support plate, on which two positioning pins 84', 86' are in turn arranged. The function of the mechanical positioning means shown in FIG. 7 corresponds in this regard to the function of the previously explained mechanical positioning means. In contrast to the previous exemplary embodiment, in the exemplary embodiment according to FIG. 7, the guide support 82' comprises a receiving means 90' for receiving an RFID transponder. Identification data for clearly identifying the mechanical positioning means can be stored in this RFID transponder. Said identification data can be read out by means of the reading apparatus of the rotary press and provided to the control apparatus 48. By means of the control apparatus 48, it is then possible to automatically check whether the mechanical positioning means used are the correct ones.

LIST OF REFERENCE SIGNS

Die plate 10
Receiving means 12
Upper punch 14
Punch guide 15
Lower punch 16
Punch guide 17
Control cam elements 20
Filling apparatus 22
Filling reservoir 24
Filling chamber 26
Feed section 28
Pressing station 30
Upper pre-pressing roller 32
Lower pre-pressing roller 34
Upper main pressing roller 36
Lower main pressing roller 38
Ejection station 40
Removal apparatus 42
Pellets 44
Discharge channel 46
Control apparatus 48
Housing 50
Guide element 52
Second channel portion 54
First channel portion 56
Discarding apparatus 58
Arrows 60, 62
Guide receiving means 66, 68
Guide carriages 70, 72
Pin receiving means 74, 76
Insertion portions 78, 80
Guide support 82
Guide support 82'
Positioning pins 84, 86
Positioning pins 84', 86'
Inscription 88
Receiving means 90'

The invention claimed is:

1. A removal apparatus for removing pellets from a die plate of a rotary press, the removal apparatus comprising:
   a housing;
   a first channel positioned on the housing and configured to receive pellets removed from the die plate;
   a guide element arranged on the housing and positioned over the die plate, the guide element configured to guide pellets produced in the rotary press from the die plate into the first channel, wherein the guide element and the first channel are moveably mounted on the housing; and
   a plurality of mechanical positioning elements configured to be alternatively inserted into the housing and cooperate with the guide element and the first channel to movably position the guide element and the first channel relative to the housing, wherein each mechanical positioning element defines a different position of one of the guide element and the first channel relative to the housing.

2. The removal apparatus according to claim 1, further comprising a second channel arranged on the housing.

3. The removal apparatus according to claim 2, wherein the second channel is moveably mounted on the housing, and wherein the position of the second channel is defined by the plurality of mechanical positioning elements.

4. The removal apparatus according to claim 3, wherein the pellets produced in the rotary press are guided into the second channel by the guide element, wherein the first channel is arranged upstream of the second channel.

5. The removal apparatus according to claim 4, further comprising a discarding apparatus configured to guide discarded pellets into the first channel.

6. The removal apparatus according to claim 3, the plurality of mechanical positioning elements comprise positioning pins configured to engage a corresponding pin receiver of the guide element and the first channel when the plurality of mechanical positioning elements are inserted in the housing.

7. A removal apparatus for removing pellets from a die plate of a rotary press, the removal apparatus comprising:
   a housing;
   a first channel positioned on the housing and configured to receive pellets removed from the die plate;

a second channel moveably mounted on the housing, wherein a position of the second channel is defined by a plurality of mechanical positioning elements;

a guide element arranged on the housing and positioned over the die plate, the guide element configured to guide pellets produced in the rotary press from the die plate into the first channel, wherein the guide element and the first channel are moveably mounted on the housing; and the plurality of mechanical positioning elements configured to be alternatively inserted into the housing and cooperate with the guide element and the first channel movably position the guide element and the first channel relative to the housing, wherein each mechanical positioning element defines a different position of one of the guide element and the first channel relative to the housing, wherein the guide element and the first channel comprise positioning pins configured to engage corresponding pin receivers of the mechanical positioning elements when inserted into the housing.

8. The removal apparatus according to claim 6, further comprising insertion portions that lead into the corresponding pin receivers and that taper as they approach the corresponding pin receivers.

9. The removal apparatus according to claim 7, wherein the mechanical positioning elements each comprise a guide support configured to be inserted into the housing and on which at least one of the positioning pins and the corresponding pin receivers are formed.

10. The removal apparatus according to claim 9, wherein the guide element and the first channel are each arranged on a guide carriage that is moveably mounted on the housing.

11. The removal apparatus according to claim 10, wherein one of the positioning pins and the corresponding pin receivers are formed on the guide carriages.

12. The removal apparatus according to claim 9, wherein the mechanical positioning elements each comprise an identifier configured to enable each of the mechanical positioning elements to be clearly identified.

13. The removal apparatus according to claim 12, characterized in that each of the identifiers comprises an RFID transponder than can be read by a reading apparatus of the rotary press.

14. A rotary press comprising:
a control apparatus;
a rotor, the rotor comprising,
    an upper punch guide configured to guide upper press punches and a lower punch guide configured to guide lower press punches,
    a die plate positioned between the upper and lower punch guides and comprising a plurality of openings, wherein the upper and lower press punches are configured to cooperate with the plurality of openings;
at least one filling station configured to load material to be pressed into the plurality of openings;
at least one pressing station configured to cooperate with the upper press punches and lower press punches during operation to press the material loaded into the plurality of openings into pellets; and
at least one ejection station configured to move the pellets from the plurality of openings onto the die plate, and at least one removal apparatus, the at least one removal apparatus comprising,
    a housing,
    a first channel positioned on the housing and configured to receive the pellets removed from the die plate,
    a guide element arranged on the housing and positioned over the die plate, the guide element configured to guide the pellets produced in the rotary press from the die plate into the first channel, wherein the guide element and the first channel are moveably mounted on the housing, and
    a plurality of mechanical positioning elements configured to be alternatively inserted into the housing and cooperate with the guide element and the first channel to movably position the guide element and the first channel relative to the housing, wherein each mechanical positioning element defines a different position of one of the guide element and the first channel relative to the housing.

* * * * *